US012597622B2

(12) United States Patent
Lee et al.

(10) Patent No.: US 12,597,622 B2
(45) Date of Patent: Apr. 7, 2026

(54) FUEL CELL SYSTEM AND FUEL CELL SYSTEM CONTROL METHOD

(71) Applicants: HYUNDAI MOTOR COMPANY, Seoul (KR); KIA CORPORATION, Seoul (KR)

(72) Inventors: Jun Su Lee, Gwangju-si (KR); Dae Jong Kim, Yongin-si (KR); Jae Won Jung, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 530 days.

(21) Appl. No.: 18/117,079

(22) Filed: Mar. 3, 2023

(65) Prior Publication Data

US 2024/0194912 A1     Jun. 13, 2024

(30) Foreign Application Priority Data

Dec. 9, 2022     (KR) ........................ 10-2022-0171639

(51) Int. Cl.
| | |
|---|---|
| *H01M 8/04* | (2016.01) |
| *H01M 8/04111* | (2016.01) |
| *H01M 8/04228* | (2016.01) |
| *H01M 8/04746* | (2016.01) |
| *H01M 8/04858* | (2016.01) |
| *H01M 16/00* | (2006.01) |

(52) U.S. Cl.
CPC ...... *H01M 8/0488* (2013.01); *H01M 8/04111* (2013.01); *H01M 8/04228* (2016.02); *H01M 8/04753* (2013.01); *H01M 16/006* (2013.01)

(58) Field of Classification Search
CPC ........... H01M 8/0488; H01M 8/04228; H01M 8/04111; H01M 8/04753
See application file for complete search history.

(56) References Cited

U.S. PATENT DOCUMENTS

2018/0026282 A1*   1/2018  Lee ................... H01M 8/04955
                                                                          429/429

FOREIGN PATENT DOCUMENTS

KR            10-1459900  B1    11/2014

* cited by examiner

*Primary Examiner* — Olatunji A Godo
(74) *Attorney, Agent, or Firm* — MCDONNELL BOEHNEN HULBERT & BERGHOFF LLP

(57)                    ABSTRACT

A fuel cell system includes a fuel cell stack and a battery that are connected to a high voltage line in parallel, a converter connected to the high voltage line and the battery while being located therebetween and configured to control a voltage at the high voltage line, and a controller, in a stop control mode of the fuel cell stack, when an error occurs in a drop control of an output voltage of the fuel cell stack, the controller dropping the voltage at the high voltage line under the output voltage of the fuel cell stack by the converter to drop the output voltage of the fuel cell stack.

10 Claims, 7 Drawing Sheets

FUEL CELL SYSTEM AND FUEL CELL SYSTEM CONTROL METHOD

CROSS REFERENCE TO RELATED APPLICATIONS

The present application claims priority to Korean Patent Application No. 10-2022-0171639, filed Dec. 9, 2022, the entire contents of which is incorporated herein for all purposes by this reference.

BACKGROUND

Field

The present disclosure relates to a fuel cell system and a fuel cell system control method. More particularly, the present disclosure relates to a control technique of a converter, an air compressor, and an air adjustment valve during stop control of a fuel cell stack.

Description of the Related Art

A fuel cell is a device that receives hydrogen and air from the outside space and generates electrical energy through an electrochemistry reaction inside a fuel cell stack, and may be used as a power source in various fields, such as fuel cell vehicles (FCEVs) and fuel cells for power generation.

The fuel cell system includes a fuel cell stack that is formed by stacking a plurality of fuel cells used as power sources, a fuel supply system that supplies a fuel such as hydrogen, etc. to the fuel cell stack, an air supply system that supplies an oxidizing agent i.e., oxygen required for the electrochemistry reaction, and water and heat management system that controls the temperature of the fuel cell stack.

The fuel supply system decompresses compressed hydrogen inside a hydrogen tank and supplies the hydrogen to an anode (fuel electrode) of the fuel cell stack, and the air supply system supplies an external air suctioned by operating an air compressor to a cathode (air electrode) of the fuel cell stack.

When hydrogen is supplied to the fuel electrode of the fuel cell stack and oxygen is supplied to the air electrode, hydrogen ions are separated through a catalytic reaction at the fuel electrode. The separated hydrogen ions are transferred to an oxidizing electrode, which is the air electrode, through an electrolyte membrane, and at the oxidizing electrode, the hydrogen ions separated at the fuel electrode, electrons, and oxygen cause an electrochemistry reaction, so that electrical energy can be obtained. Specifically, electrochemical oxidation of hydrogen occurs at the fuel electrode, and electrochemical reduction of oxygen occurs at the air electrode, and electricity and heat are generated due to the movement of electrons generated at this time, and steam or water is generated by a chemical reaction of combining hydrogen and oxygen.

A discharge device is provided to discharge by-products such as steam, water, and heat generated during the electric energy generation process of the fuel cell stack, and unreacted hydrogen, oxygen, etc., and gases such as steam, hydrogen, and oxygen are discharged to the atmosphere through an exhaust passage.

The electrochemistry reaction occurring inside the fuel cell is represented by the reaction formula as follows.

[Reaction at anode]$2H_2(g) \rightarrow 4H^+(aq.) + 4e^-$

[Reaction at cathode]$O_2(g) + 4H^+(aq.) + 4e^- \rightarrow 2H_2O(l)$

[Total reaction]$2H_2(g) + O_2(g) \rightarrow 2H_2O(l) + $electric energy$+$heat energy As shown in the above reaction formula, at the anode, hydrogen molecules are decomposed to generate 4 hydrogen ions and 4 electrons. The electrons generate current (electrical energy) by moving through an external circuit, and the hydrogen ions move to the cathode through an electrolyte membrane to cause a reduction reaction, and water and heat are generated as the by-products of the electrochemistry reaction.

Meanwhile, the fuel cell stack enters a stop control mode when there is no required output of the fuel cell stack, such as in an idle state. However, when the stop control mode of the fuel cell stack continues, a voltage may fall below a lower limit value, and accordingly, the deterioration of the fuel cell stack is intensified.

Therefore, in the stop control of the fuel cell stack, the supply of hydrogen is maintained (hydrogen recirculation and inflow of pure hydrogen), the air compressor is also maintained at the lowest speed, and a flow of air flowing into the cathode is adjusted by adjusting an opening degree of an air adjustment valve.

Accordingly, it is possible to prevent a voltage of the fuel cell stack from falling below the lower limit value.

Meanwhile, when the fuel cell stack enters the stop control mode, there may be a problem an output voltage of the fuel cell stack is not reduced in response to a condition of in that the fuel cell stack.

This problem is caused due to the case where, even when the fuel cell stack enters the stop control mode, in response to a preceding operation mode of the fuel cell stack, a large amount of hydrogen and air inside the fuel cell stack exists to prevent the output from being reduced.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to provide a fuel cell system and a fuel cell system control method, wherein in entering of a fuel cell stack into a stop control mode, even when an output voltage of the fuel cell stack is not dropped, the fuel cell system can uses a converter to drop the output voltage of the fuel cell stack.

In order to achieving the objective, a fuel cell system of the present disclosure includes a fuel cell stack and a battery that are connected to a high voltage line in parallel, a converter connected to the high voltage line and the battery while being located therebetween and configured to control a voltage at the high voltage line, and a controller, in a stop control mode of the fuel cell stack, when an error occurs in a drop control of an output voltage of the fuel cell stack, the controller dropping the voltage at the high voltage line under the output voltage of the fuel cell stack by the converter to drop the output voltage of the fuel cell stack.

The fuel cell system may include an air compressor configured to send air to a cathode of the fuel cell stack, and an air adjustment valve configured to adjust the air flowing from the air compressor to the cathode, wherein when the fuel cell stack enters the stop control mode, the controller may control drop of the output voltage of the fuel cell stack by adjusting a speed of the air compressor or the air adjustment valve.

The controller may be configured to drop the output voltage of the fuel cell stack by presetting a target voltage value of the converter and dropping the voltage of the high voltage line such that the voltage at the high voltage line may follow the target voltage value.

The target voltage value may be preset between a voltage upper limit value and a voltage lower limit value in the stop control mode of the fuel cell stack that may be preset in response to a state of the battery.

A battery SOC factor may be equal to or higher than a threshold value at the time of entering of the fuel cell stack into the stop control mode, the controller may stop drop of the voltage at the high voltage line and maintain the voltage.

When the fuel cell stack enters the stop control mode, the controller may control the output voltage of the fuel cell stack to be less than or equal to a preset voltage upper limit value in the stop control mode of the fuel cell stack, and when the output voltage of the fuel cell stack is not dropped less than or equal to the voltage upper limit value of the stop control mode, the controller may drop the voltage at the high voltage line to the preset target voltage.

The controller may be configured to compare the output voltage of the fuel cell stack to the voltage at the high voltage line, and when the output voltage of the fuel cell stack is dropped to be less than the voltage at the high voltage line, the controller may maintain the voltage at the high voltage line, control the air compressor or the air adjustment valve to maintain the output voltage of the fuel cell stack between a voltage upper limit value and a voltage lower limit value in the stop control mode of the fuel cell stack, and when an error occurs in control of the output voltage of the fuel cell stack, the controller may drop the voltage at the high voltage line to the preset target voltage.

When the output voltage of the fuel cell stack rises while being dropped from the voltage upper limit value in the stop control mode toward the voltage lower limit value, the controller may determine that an error occurs in control of the output voltage of the fuel cell stack.

When a battery SOC factor is less than a threshold value in the time of entering of the fuel cell stack to the stop control mode, the controller may drop the voltage at the high voltage line to the target voltage value.

The controller may be configured to compare the output voltage of the fuel cell stack to the voltage of the high voltage line, and when the output voltage of the fuel cell stack is dropped to be less than the voltage at the high voltage line, the controller may control the air compressor or the air adjustment valve to maintain the output voltage of the fuel cell stack between the voltage upper limit value and the voltage lower limit value in the stop control mode of the fuel cell stack.

When an error occurs in drop control of the output voltage of the fuel cell stack, the controller may drop the voltage at the high voltage line less than or equal to the output voltage of the fuel cell stack through the converter, thereby dropping the output voltage of the fuel cell stack and maintaining the fuel cell stack at a constant voltage.

The controller may be configured to determine whether or not the battery is over-charged in the stop control mode of the fuel cell stack, and when the controller determines that the battery is over-charged, the controller may stop an operation of the air compressor, open the air adjustment valve, and operate the air compressor for a predetermined time for a predetermined period, thereby exhausting hydrogen that is crossover from an anode to a cathode.

As a fuel cell system control method configured to control a fuel cell system, the fuel cell system control method may include: entering, by a controller, a fuel cell stack into a stop control mode; controlling, by the controller, an output voltage of the fuel cell stack to be dropped; determining, by the controller, an error in drop control of the output voltage of the fuel cell stack; and dropping, by the controller, the output voltage of the fuel cell stack, such that when an error occurs in the drop control of the output voltage of the fuel cell stack, the controller may drop a voltage at a high voltage line to be less than or equal to the output voltage of the fuel cell stack via a converter.

According to the fuel cell system and the fuel cell system control method of the present disclosure, when the fuel cell stack enters the stop control mode, even when the output voltage of the fuel cell stack is not dropped, the output voltage of the fuel cell stack can be dropped by using the converter.

DETAILED DESCRIPTION

Figure 1:
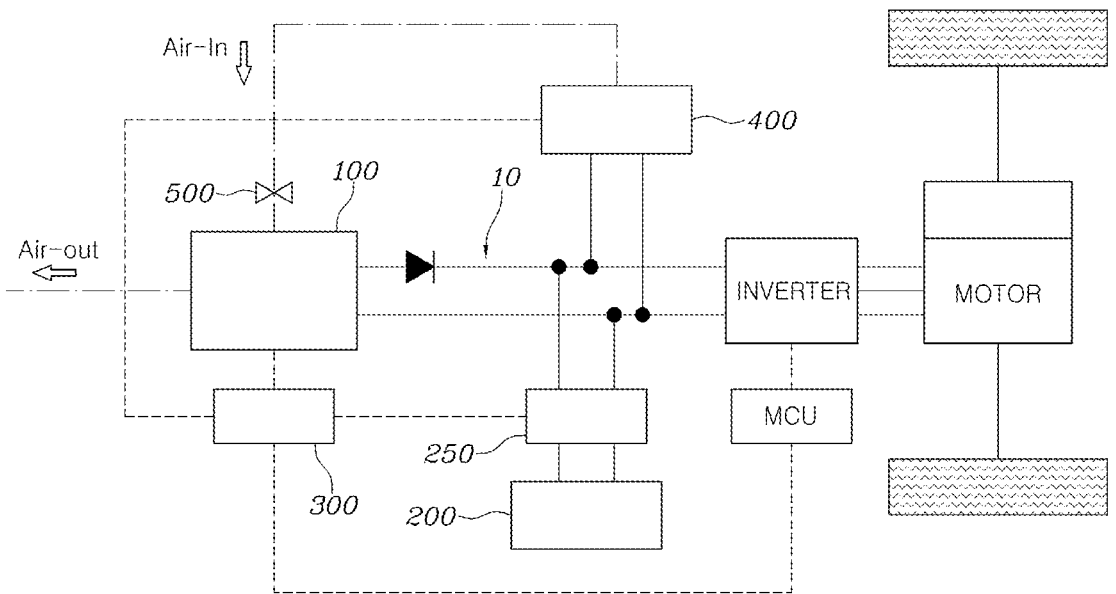
FIG. 1 is a schematic view of a fuel cell system according to an embodiment of the present disclosure.

Hereinbelow, a preferred embodiment described in the specification will be described in detail with reference to accompanying drawings, and regardless of the reference numerals, the same reference numerals will refer to the same or like parts, and redundant descriptions thereof will be omitted.

Furthermore, if it is decided that the detailed description of known function or configuration related to the disclosure makes the subject matter of the disclosure unclear, the detailed description is omitted. Furthermore, the accompanying drawings are only for understanding of the preferred embodiments of the present disclosure, and the technical ideas disclosed in the specification are not limited by the accompanying drawings, and those skilled in the art will appreciate that various modifications, additions and substitutions are possible, without departing from the scope and spirit of the disclosure as disclosed in the accompanying claims.

It will be understood that, although the terms first and/or second, etc. may be used herein to describe various elements, these elements should not be limited by these terms. These terms are only used to distinguish one element, from another element.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

FIG. 1 is a schematic view of a fuel cell system according to an embodiment of the present disclosure. Referring to FIG. 1, according to the embodiment of the present disclosure, the fuel cell system includes a fuel cell stack 100 and a battery 200 that are connected to a high voltage line 10 in parallel, a converter 250 connected to the high voltage line 10 and the battery 200 while being located therebetween and configured to control a voltage at the high voltage line 10, and a controller 300. In a stop control mode of the fuel cell stack 100, when an error occurs in a drop control of an output voltage of the fuel cell stack 100, the controller drops the output voltage of the fuel cell stack 100 by dropping the voltage at the high voltage line 10 to be less than or equal to the output voltage of the fuel cell stack 100 by the converter 250.

Specifically, the converter 250 may be a bi directional high voltage dc-dc converter (BHDC). The converter 250 is connected to the high voltage line 10 and the battery 200 while being located therebetween, and may charge the battery 200 by dropping a high voltage generated from the fuel cell stack 100, and on the other hand, may discharge electricity of the battery by amplifying a voltage of the battery 200. Furthermore, the converter 250 may adjust a load line voltage (e.g., motor).

Meanwhile, the stop control mode of the fuel cell stack 100 may mean a state in which a required output of the fuel cell stack 100 is 0 (e.g., idle state of fuel cell vehicle). When the fuel cell stack 100 enters the stop control mode, the amount of air and hydrogen reacting in the fuel cell stack 100 is sharply reduced to reduce the amount of voltage generation of the fuel cell stack 100.

However, when driving in a high output state immediately before the fuel cell stack 100 enters the stop control mode, there is a lot of unreacted hydrogen and air remaining in the fuel cell stack 100, so that the output voltage of the fuel cell stack 100 may not be dropped.

In other words, an error may occur in the drop control of the fuel cell stack 100. In this case, the controller 300 of the present disclosure drops the voltage at the high voltage line 10 to be less than or equal to a present output voltage of the fuel cell stack 100 by the converter 250 so as to forcibly drop the output voltage of the fuel cell stack 100.

Accordingly, even when the output voltage are not dropped in the stop control mode of the fuel cell stack 100, the output voltage of the fuel cell stack 100 can be forcibly dropped by controlling the converter 250, and thus deterioration of the fuel cell stack 100 due to overvoltage can be prevented.

Meanwhile, the controller may include a communication device communicating with other controllers or a sensor to control the function in charge, a memory storing an operation system or a logic command and input/output information, and at least one process performing determination, calculation, and decision necessary for controlling the function in charge.

Meanwhile, referring to FIG. 1, the fuel cell system may include an air compressor 400 configured to send air to a cathode of the fuel cell stack 100, and an air adjustment valve 500 configured to adjust the air flowing from the air compressor 400 to the cathode. Furthermore, when the fuel cell stack 100 enters the stop control mode, the controller 300 can control the drop of the output voltage of the fuel cell stack 100 by adjusting the speed of the air compressor 400 or the air adjustment valve 500.

Specifically, when the fuel cell stack 100 enters the stop control mode, the speed of the air compressor 400 is reduced and the air adjustment valve 500 is closed, thereby reducing the flow of air flowing into the fuel cell stack 100, so that the output voltage of the fuel cell stack 100 may be dropped.

Meanwhile, at the same time, when the fuel cell stack 100 enters the stop control mode, the controller presets the target voltage value of the converter 250, and may drop the output voltage of the fuel cell stack 100 such that such that the voltage at the high voltage line 10 is dropped to follow the target voltage value.

Figure 2:
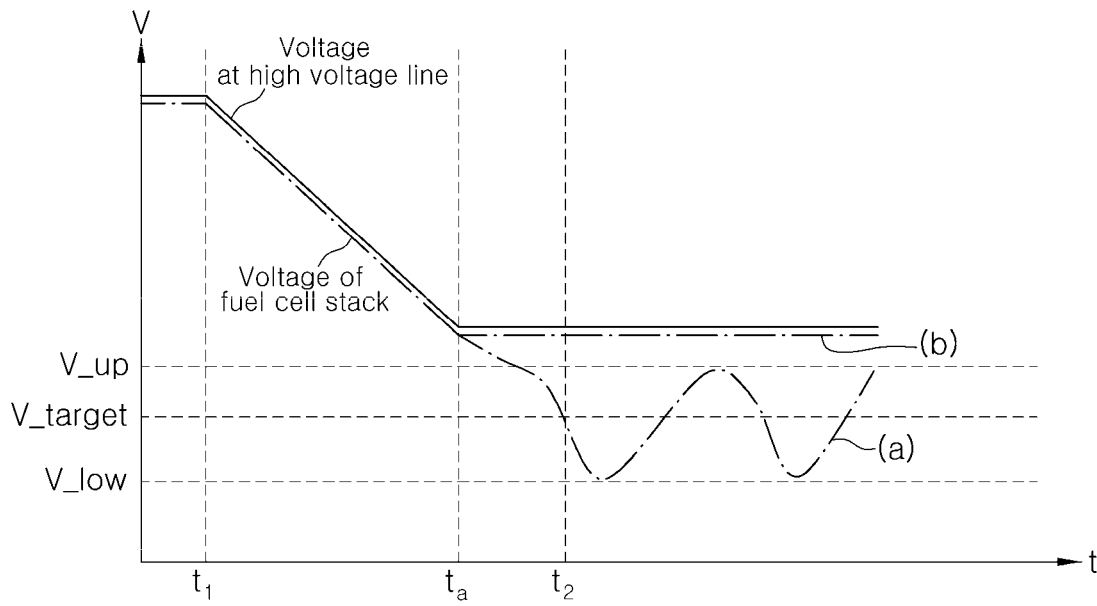
FIGS. 2, 3, 4, 5, and 6 are graphs showing control of the fuel cell system.
Figure 7:
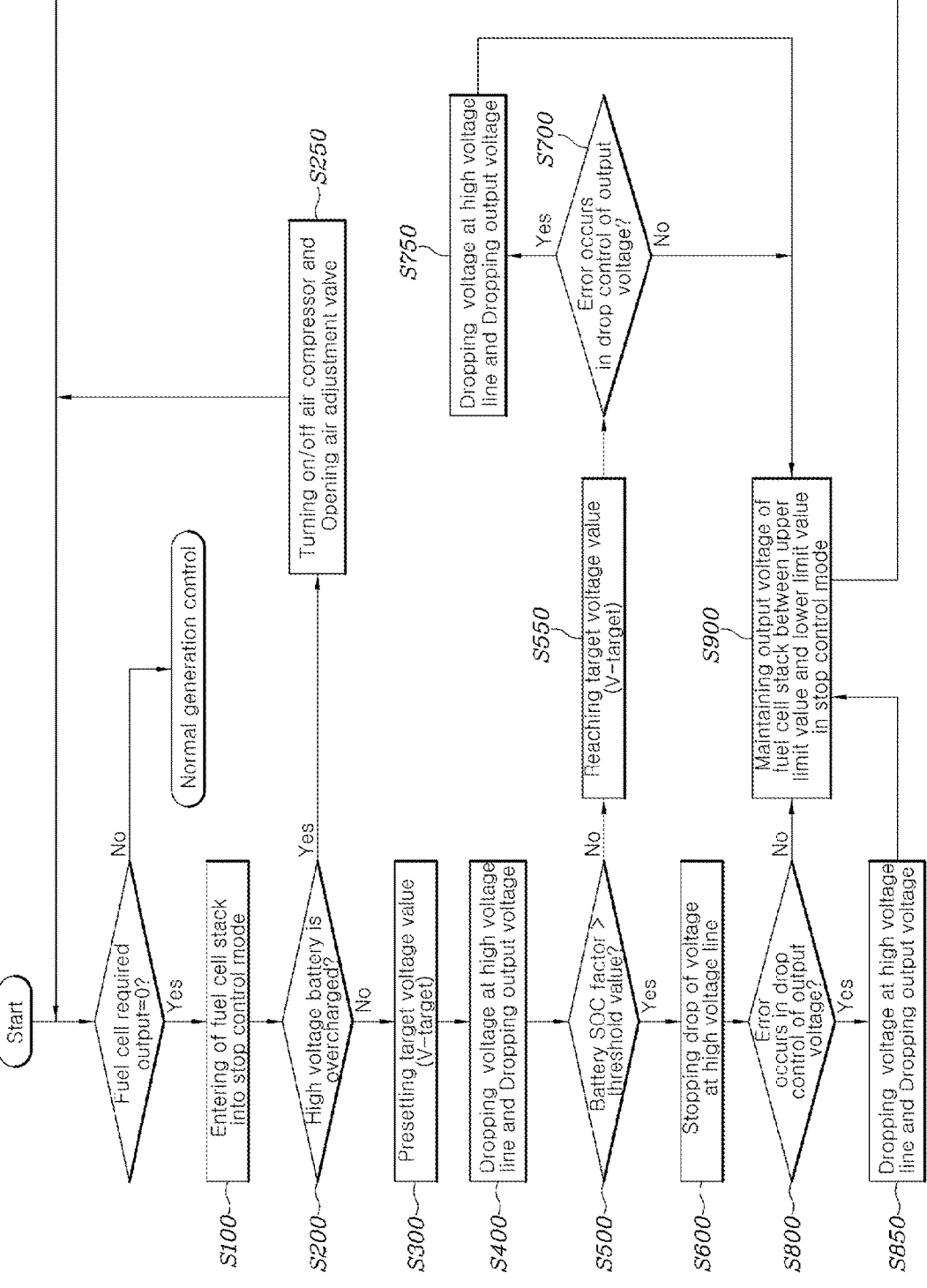
FIG. 7 is a flowchart showing a fuel cell system control method according to an embodiment of the present disclosure.

Specifically, referring to FIGS. 2 and 7, at the time point $t_1$ when the fuel cell stack 100 enters the stop control mode at S100, the controller 300 presets the target voltage value V_target of the converter 250 at S300. According to the setting of the target voltage value of the converter 250, the voltage at the high voltage line 10 is dropped while following the target voltage value, and the output voltage of the fuel cell stack is also dropped at S400.

At a time point $t_2$ when the voltage at the high voltage line 10 reaches the target voltage value, the output voltage of the fuel cell stack 100 is dropped more than the preceding time point.

In other words, when the fuel cell stack 100 enters the stop control mode, the output voltage of the fuel cell stack 100 may be dropped by reducing the flow of air flowing into the fuel cell stack 100, and at the same time, the voltage at the high voltage line 10 may be dropped by the converter 250 so that the output voltage of the fuel cell stack 100 has a value less than or equal to the voltage at the high voltage line 10.

Meanwhile, the target voltage value V_target may be preset between a voltage upper limit value V_up and a voltage lower limit value V_low in the stop control mode of the fuel cell stack 100 preset according to a battery state.

Specifically, the state of the battery 200 may be a present SOC (state of charge) of the battery 200, a SOH (state of health), or a voltage size of the battery 200. Furthermore, the upper limit value and the lower limit value in the stop control mode of the fuel cell stack 100 mean an upper limit value and a lower limit value of a voltage that should be maintained to prevent deterioration when the fuel cell stack 100 enters the stop control mode.

For example, when the state of the battery 200 is the present SOC of the battery 200 and it is determined that the SOC of the battery 200 is lowered, the target voltage value is preset to be lowered and the output voltage of the fuel cell stack 100 may be maintained at about the voltage lower limit value in the stop control mode. Accordingly, adverse effects on durability of the fuel cell stack 100 can be prevented.

However, when it is determined that the SOC of the battery 200 is high, the target voltage value is preset to be high so that the output voltage of the fuel cell stack 100 may be maintained at about the voltage upper limit value of the stop control mode. The maintaining the output voltage of the fuel cell stack 100 at about the upper limit value may be disadvantaged on the durability of the fuel cell stack 100. However, when the target voltage value is preset to be low, since the battery 200 may be over-charged by an output flowing into the battery 200, it is preferable to maintain the output voltage at about the voltage upper limit value in the stop control mode.

Meanwhile, when the fuel cell stack 100 enters the stop control mode and a SOC factor of the battery 200 is equal to or higher than a threshold value, the controller 300 may stop the drop of the voltage at the high voltage line 10 and maintain the voltage.

Figure 3:
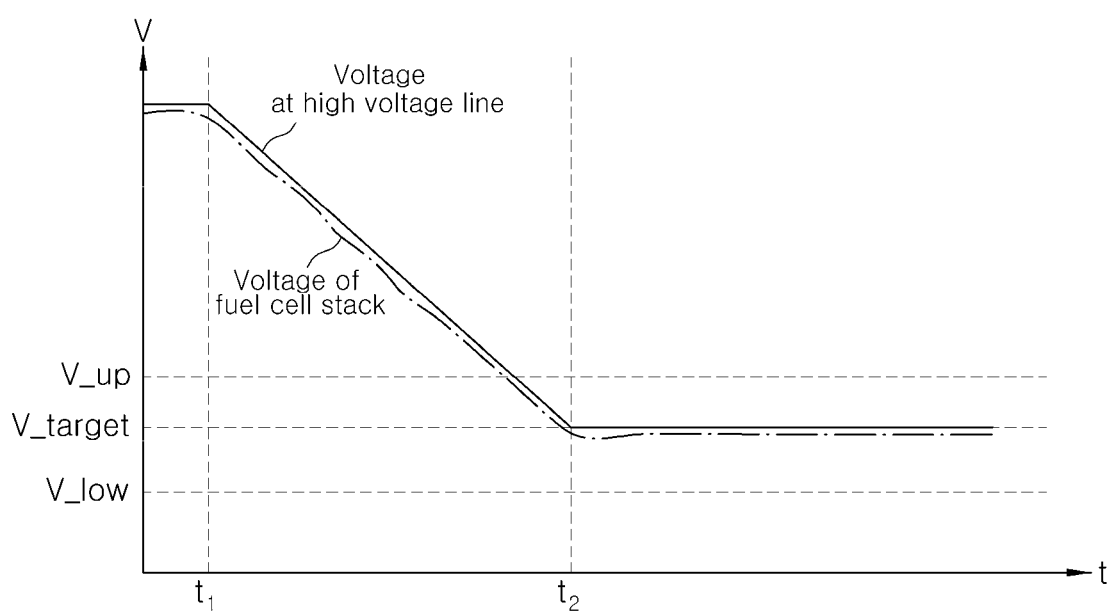

Specifically, referring to FIGS. 3 and 7, in entering of the fuel cell stack 100 into the stop control mode at S100, even though the target voltage value is preset at S300, when it may be determined that the battery is overcharged, at S500, by an output generated in a process in which the output voltage of the fuel cell stack is dropped, the drop of the voltage at the high voltage line 10 stops at a time point $t_a$, at S600.

After a time point $t_a$, by speed adjustment of the air compressor 400 or opening degree adjustment of the air adjustment valve 500, the output voltage of the fuel cell stack 100 is tried to be adjusted, and it is determined whether or not an error occurs in the drop control of the output voltage at S800.

Graph a shows a case in which it is possible to adjust the output voltage of the fuel cell stack 100 by the speed adjustment of the air compressor 400 or the opening and closing degree adjustment of the air adjustment valve 500.

However, graph b shows a case in which it is impossible to adjust the output voltage of the fuel cell stack 100 by the speed adjustment of the air compressor 400 or the opening and closing degree adjustment of the air adjustment valve 500.

Meanwhile, the battery SOC factor may be a size of a current flowing into the battery 200, a voltage of the battery 200, or the SOC of the battery 200.

Meanwhile, when the fuel cell stack 100 enters the stop control mode, the controller 300 may control the output voltage of the fuel cell stack 100 to be less than and equal to the preset voltage upper limit value V_up in the stop control mode of the fuel cell stack 100.

For example, referring to FIGS. 3 and 7, the graph a connected from the time point $t_a$ shows that the output voltage of the fuel cell stack 100 is dropped less than or equal to the voltage upper limit value of the stop control mode and is maintained between the upper limit value and the lower limit value.

The graph shows adjusting the output voltage of the fuel cell stack 100 by adjusting the speed of the air compressor 400 or the opening and closing degree of the air adjustment valve 500.

However, when the output voltage of the fuel cell stack 100 is not dropped less than or equal to the voltage upper limit in the stop control mode, as shown in the graph b connected from the time point $t_a$ in FIG. 3, the output voltage of the fuel cell stack 100 is maintained higher than the voltage upper limit value in the stop control mode.

This is because a lot of air and hydrogen remaining in the fuel cell stack 100 reacts and the output voltage cannot be dropped.

Therefore, in this case, it is determined that an error occurs in the drop control of the output voltage at S800, and the voltage at the high voltage line 10 is dropped to the preset target voltage to drop the output voltage of the fuel cell stack 100 at S850.

Figure 4:
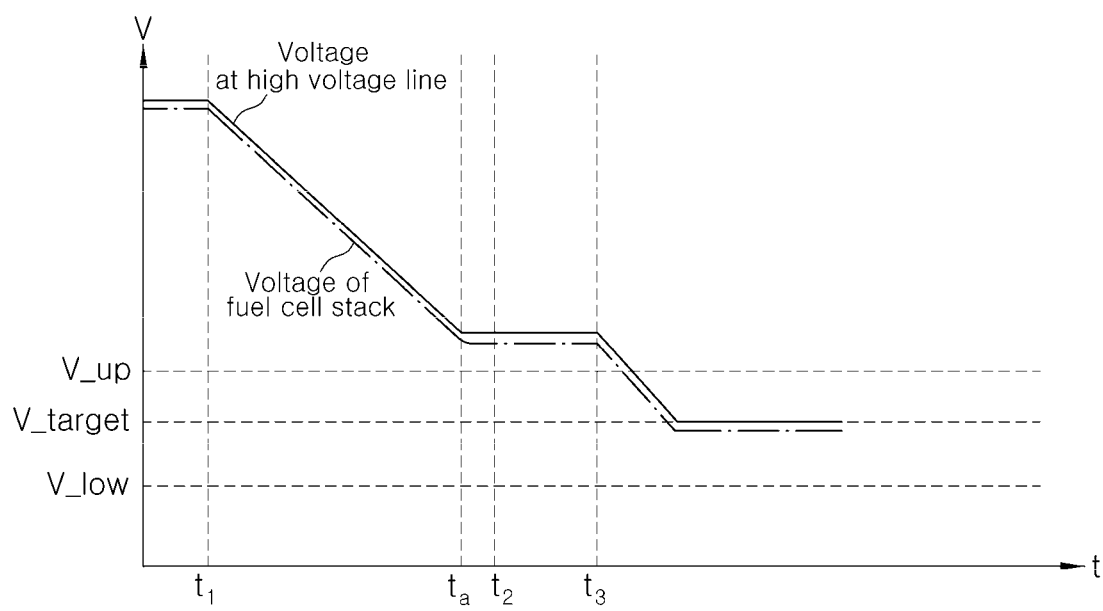

Specifically, referring to FIGS. 4 and 7, at the time point t3 when it is determined that the output voltage of the fuel cell stack 100 is not dropped less than or equal to the voltage upper limit value in the stop control mode, the voltage at the high voltage line 10 is dropped to the preset target voltage at S850, so that the output voltage of the fuel cell stack 100 can be dropped.

In other words, even when the voltage at the high voltage line 10 is dropped but the output voltage of the fuel cell stack 100 is not dropped for a predetermined time, the controller 300 may determine as an error in the drop control and may forcibly drop the output voltage of the fuel cell stack 100 by the converter 250.

Meanwhile, when the output voltage of the fuel cell stack 100 is dropped less than the voltage at the high voltage line 10, i.e., it is determined that an error does not occur in the drop control of the output voltage, the controller 300 maintains the voltage at the high voltage line 10, and control the air compressor 400 or the air adjustment valve 500 to maintain the output voltage of the fuel cell stack 100 between the voltage upper limit value and the voltage lower limit value in the stop control mode of the fuel cell stack 100 at S900.

However, during controlling the output voltage of the fuel cell stack 100, when an error occurs in the control of the output voltage of the fuel cell stack 100, the voltage at the high voltage line 10 may be dropped to the preset target voltage.

Figure 5:
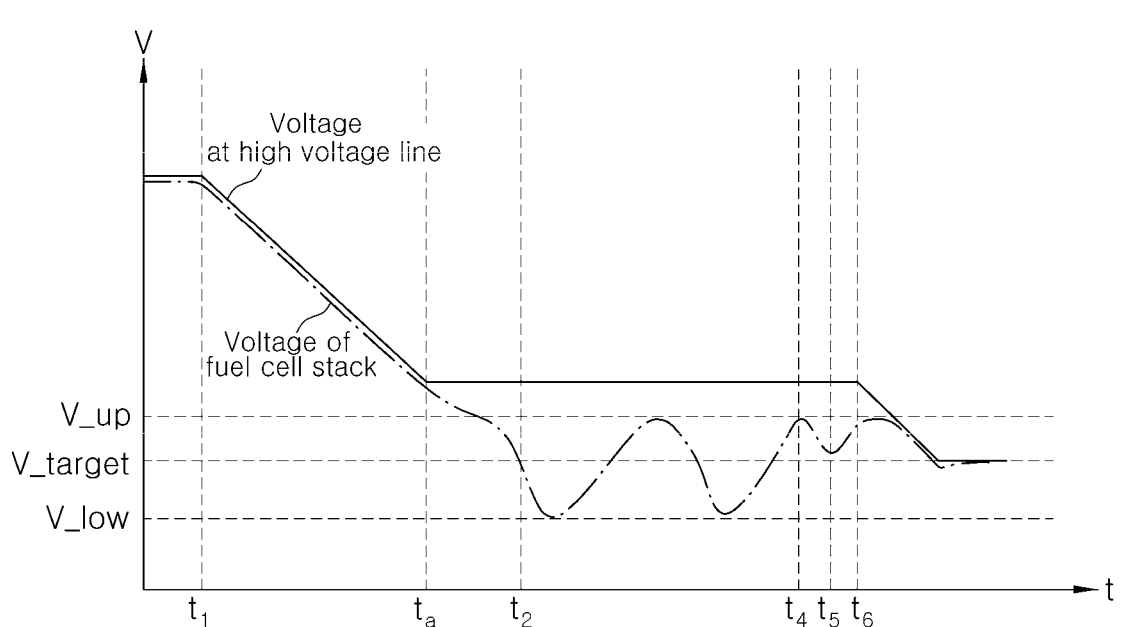

Specifically, referring to FIG. 5, at the time point $t_a$, the output voltage of the fuel cell stack 100 is dropped less than the voltage at the high voltage line 10, and the voltage is maintained between the voltage upper limit value and the voltage lower limit value in the stop control mode until a time point $t_5$. However, at the time point $t_5$, when the voltage shows a tendency to rise while moving toward the lower limit value, it may be determined that an error occurs in the control of the output voltage at S800.

In the case, the controller 300 controls the converter 250 (time point to) to drop the voltage at the high voltage line 10 to the preset target voltage, at S850. Accordingly, the output voltage of the fuel cell stack 100 may be dropped again.

On the other words, when the fuel cell stack 100 enters the stop control mode and the SOC factor of the battery 200 is less than the threshold value, the controller 300 may drop the voltage at the high voltage line 10 to the target voltage value.

In other words, when comparing FIG. 2 to FIG. 3, in FIG. 2 showing the SOC factor of the battery 200 that is less than the threshold value, it is shown that the voltage at the high voltage line 10 is dropped to the target voltage value.

On the other hand, In FIG. 3, when the SOC factor of the battery 200 is equal to or higher than the threshold value, in order to prevent overcharge, etc. of the battery 200, at the time point $t_a$, drop of the voltage at the high voltage line 10 stops.

In other words, when the SOC factor of the battery 200 is less than the threshold value such as a low SOC of the battery 200, the voltage at the high voltage line 10 can be dropped to the target voltage value at S550.

Meanwhile, the controller 300 compares the output voltage of the fuel cell stack 100 to the voltage at the high voltage line 10, and when the output voltage of the fuel cell stack 100 is dropped less than the voltage at the high voltage line 10, the controller 300 controls the air compressor 400 or the air adjustment valve 500 so that the output voltage of the fuel cell stack 100 may be maintained between the voltage upper limit value and the lower limit value in the stop control mode of the fuel cell stack 100.

Figure 6:
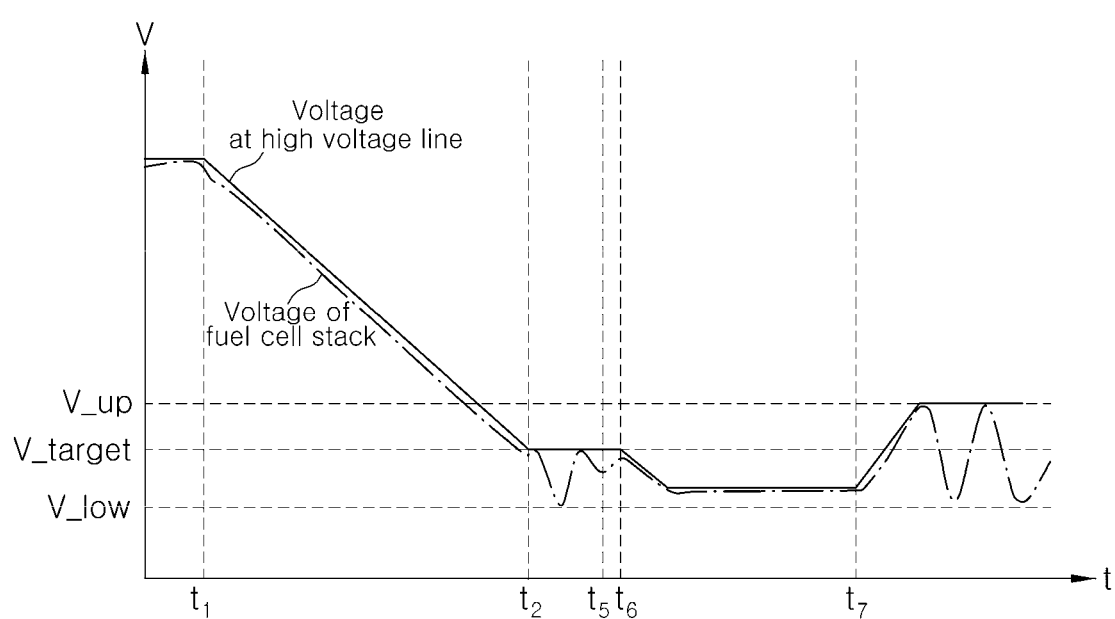

Specifically, referring to FIGS. 6 and 7, as the voltage at the high voltage line 10 is dropped to the target voltage value, the output voltage of the fuel cell stack 100 is also dropped to be adjacent to the voltage at the high voltage line 10. From the time point $t_2$ when the voltage at the high voltage line 10 reaches the target voltage value, the output voltage of the fuel cell stack 100 is adjusted by control of the air compressor 400 or the air adjustment valve 500.

Meanwhile, as shown in the time point $t_5$, when the voltage shows a tendency to rise while moving toward the lower limit value, it may be determined that an error occurs in the control of the output voltage at S700.

In this case, the controller 300 drops the voltage at the high voltage line 10 to be less than or equal to the output voltage of the fuel cell stack 100 by the converter 250, thereby dropping the output voltage of the fuel cell stack 100 at S750 and the fuel cell stack can maintain a constant voltage.

In other words, when an error occurs in the drop control of the output voltage, the voltage at the high voltage line 10 is dropped more than the target voltage value, so that the output voltage of the fuel cell stack 100 can be dropped again.

At this time, the output voltage of the fuel cell stack 100 can maintain the constant voltage.

Then, at t₇, the voltage at the high voltage line 10 rises, and the output voltage of the fuel cell stack 100 can be adjusted by adjusting the air compressor 400 or the air adjustment valve 500 again.

On the other hand, the controller 300 determines whether or not the battery 200 is overcharged in the stop control mode of the fuel cell stack 100 at S200, and when it is determined that the battery 200 is in the overcharged state, operation of the air compressor 400 is interrupted, and the air adjustment valve is opened at S250, and the air compressor 400 is operated for a predetermined time for each predetermined period, thereby exhausting hydrogen cross-over from an anode to the cathode.

Specifically, when entering the stop control mode, the air compressor 400 and the air adjustment valve 500 need to be controlled in response to the SOC state of the battery 200. In other words, when it is determined that the battery 200 is in the overcharged state or there is a possibility that the battery 200 will be overcharged upon entering the stop control mode, generation of the fuel cell stack 100 is interrupted and it is preferable to discharge electricity of the battery 200 to prevent the battery 200 from the overcharged state.

Therefore, when it is determined that the battery 200 is in the overcharged state, it is preferable that operation of the air compressor 400 is interrupted. However, it is preferable that the air adjustment valve 500 is opened. When the air adjustment valve 500 is closed, air flowing into the cathode can be blocked, but when a required output of the fuel cell stack 100 is generated, response performance is reduced due to the time required to completely open the value. Accordingly, in order to improve response performance, it is preferable that the air adjustment valve 500 remains opened.

Furthermore, when operation of the air compressor 400 is interrupted, hydrogen may be crossover from the anode to the cathode, so that it is preferable that the air compressor 400 is operated for a predetermined time for each predetermined period in order to reduce density of discharged hydrogen.

Although the preferred embodiments of the present disclosure have been disclosed in detail only with respect to the above specific embodiments, those skilled in the art will appreciate that various modifications, additions, and substitutions are possible, without departing from the spirit and scope of the present disclosure, and it is appropriate that the various modifications, additions, and substitutions belong to the accompanying claims.

The invention claimed is:

1. A fuel cell system comprising:
a fuel cell stack and a battery that are connected to a high voltage line in parallel;
an air compressor configured to send air to a cathode of the fuel cell stack; and
an air adjustment valve configured to adjust the air flowing from the air compressor to the cathode;

a converter connected to and positioned between the high voltage line and the battery, the converter being configured to control a voltage at the high voltage line; and
a controller operatively connected to the sir compressor, the air adjustment valve, and the converter, and configured to control an output voltage of the fuel cell stack to be between a preset voltage upper limit value and a preset voltage lower limit value in a stop control mode of the fuel cell stack, by adjusting a speed of the air compressor or the air adjustment valve in a state where a hydrogen supply to the fuel cell stack is maintained;
wherein, based on a state in which the output voltage of the fuel cell stack is maintained above the preset voltage upper limit value in a the stop control mode of the fuel cell stack, the controller is configured to drop the voltage at the high voltage line to follow a target voltage value preset between the preset voltage upper limit value and the preset voltage lower limit value by the converter to drop the output voltage of the fuel cell stack.

2. The fuel cell system of claim 1, wherein the voltage upper limit value and the voltage lower limit value are preset in response to a state of the battery.

3. The fuel cell system of claim 1, wherein a battery state of charge factor is equal to or higher than a threshold value at a time of entering of the fuel cell stack into the stop control mode, and the controller stops drop of the voltage at the high voltage line and maintains the voltage.

4. The fuel cell system of claim 3, wherein the controller is configured to compare the output voltage of the fuel cell stack to the voltage at the high voltage line, and when the output voltage of the fuel cell stack is dropped lower than the voltage at the high voltage line, the controller maintains the voltage at the high voltage line, controls the air compressor or the air adjustment valve to maintain the output voltage of the fuel cell stack between a voltage upper limit value and a voltage lower limit value in the stop control mode of the fuel cell stack, and when an error occurs in control of the output voltage of the fuel cell stack, the controller drops the voltage at the high voltage line to the preset target voltage.

5. The fuel cell system of claim 4, wherein when the output voltage of the fuel cell stack rises while being dropped from the voltage upper limit value in the stop control mode toward the voltage lower limit value, the controller determines that an error occurs in control of the output voltage of the fuel cell stack.

6. The fuel cell system of claim 1, wherein when a battery state of charge factor is less than a threshold value in the time of entering of the fuel cell stack to the stop control mode, the controller drops the voltage at the high voltage line to the target voltage value.

7. The fuel cell system of claim 6, wherein the controller is configured to compare the output voltage of the fuel cell stack to the voltage of the high voltage line, and when the output voltage of the fuel cell stack is dropped lower than the voltage at the high voltage line, the controller controls the air compressor or the air adjustment valve to maintain the output voltage of the fuel cell stack between the voltage upper limit value and the voltage lower limit value in the stop control mode of the fuel cell stack.

8. The fuel cell system of claim 1, wherein when an error occurs in drop control of the output voltage of the fuel cell stack, the controller drops the voltage at the high voltage line less than or equal to the output voltage of the fuel cell stack through the converter, thereby dropping the output voltage of the fuel cell stack and maintaining the fuel cell stack at a constant voltage.

9. The fuel cell system of claim 1, wherein the controller is configured to determine whether the battery is overcharged in the stop control mode of the fuel cell stack, and when the controller determines that the battery is overcharged, the controller stops an operation of the air compressor, opens the air adjustment valve, and operates the air compressor for a predetermined time for a predetermined period, thereby exhausting hydrogen that is crossover from an anode to a cathode.

10. A fuel cell system control method comprising:

entering, by a controller, a fuel cell stack into a stop control mode;

controlling, by the controller, an output voltage of the fuel cell stack to be between a preset voltage upper limit value and a preset voltage lower limit value in a stop control mode, by adjusting a speed of an air compressor or an air adjustment valve in a state where a hydrogen supply to the fuel cell stack is maintained;

determining, by the controller, whether the output voltage of the fuel cell stack is maintained above the preset voltage upper limit value; and dropping, by the controller, the voltage at the high voltage line to follow a target voltage value preset between the preset voltage upper limit and the preset voltage lower value via a converter, based on determining that the output voltage of the fuel cell stack is maintained above the preset voltage limit value in the stop control mode.

\* \* \* \* \*